United States Patent [19]

Campbell et al.

[11] Patent Number: 5,423,340
[45] Date of Patent: Jun. 13, 1995

[54] APPARATUS FOR REMOVING AN OIL SPILL ON A BODY OF WATER

[75] Inventors: Willis R. Campbell, Olathe; Forrest L. Robinson, Mission, both of Kans.; Bruce A. Perry, Fenton, Mo.; Dan Schwlefert, Overland Park, Kans.

[73] Assignee: Separation Oil Services, Inc., Mission, Kans.

[21] Appl. No.: 226,754

[22] Filed: Apr. 12, 1994

Related U.S. Application Data

[62] Division of Ser. No. 880,141, May 7, 1992, Pat. No. 5,316,029.

[51] Int. Cl.$^6$ ................................................ B08B 1/00
[52] U.S. Cl. ...................................... 134/110; 134/201; 210/923; 210/922; 494/901
[58] Field of Search .................... 134/110, 201, 111; 15/359, 409; 210/923, 922; 494/901

[56] References Cited

U.S. PATENT DOCUMENTS

| | | | |
|---|---|---|---|
| 2,330,508 | 9/1943 | McColl | 210/923 X |
| 3,556,301 | 1/1971 | Smith | 210/923 X |
| 3,578,171 | 5/1971 | Usher | 210/923 X |
| 3,630,432 | 12/1971 | Murkes | 494/901 X |
| 4,525,155 | 6/1985 | Nilsson | 494/901 X |
| 4,797,210 | 1/1989 | Lonardo | 210/923 X |
| 5,032,275 | 7/1991 | Thew | 210/923 X |
| 5,141,632 | 8/1992 | Catcher | 210/923 X |
| 5,154,835 | 10/1992 | De Michael | 210/923 |

*Primary Examiner*—Frankie L. Stinson

[57] ABSTRACT

A system for removing oil from oil/water or oil/sand or oil/water/sand mixtures. An oil/water mixture is taken from an oil spill on the surface of the water or from other sources such as producing oil wells and is transported to a surge tank where it is agitated and then passed on to a separator which separates the oil from the water. The system also covers separating oil from sand or earth when the spill is on land.

4 Claims, 5 Drawing Sheets

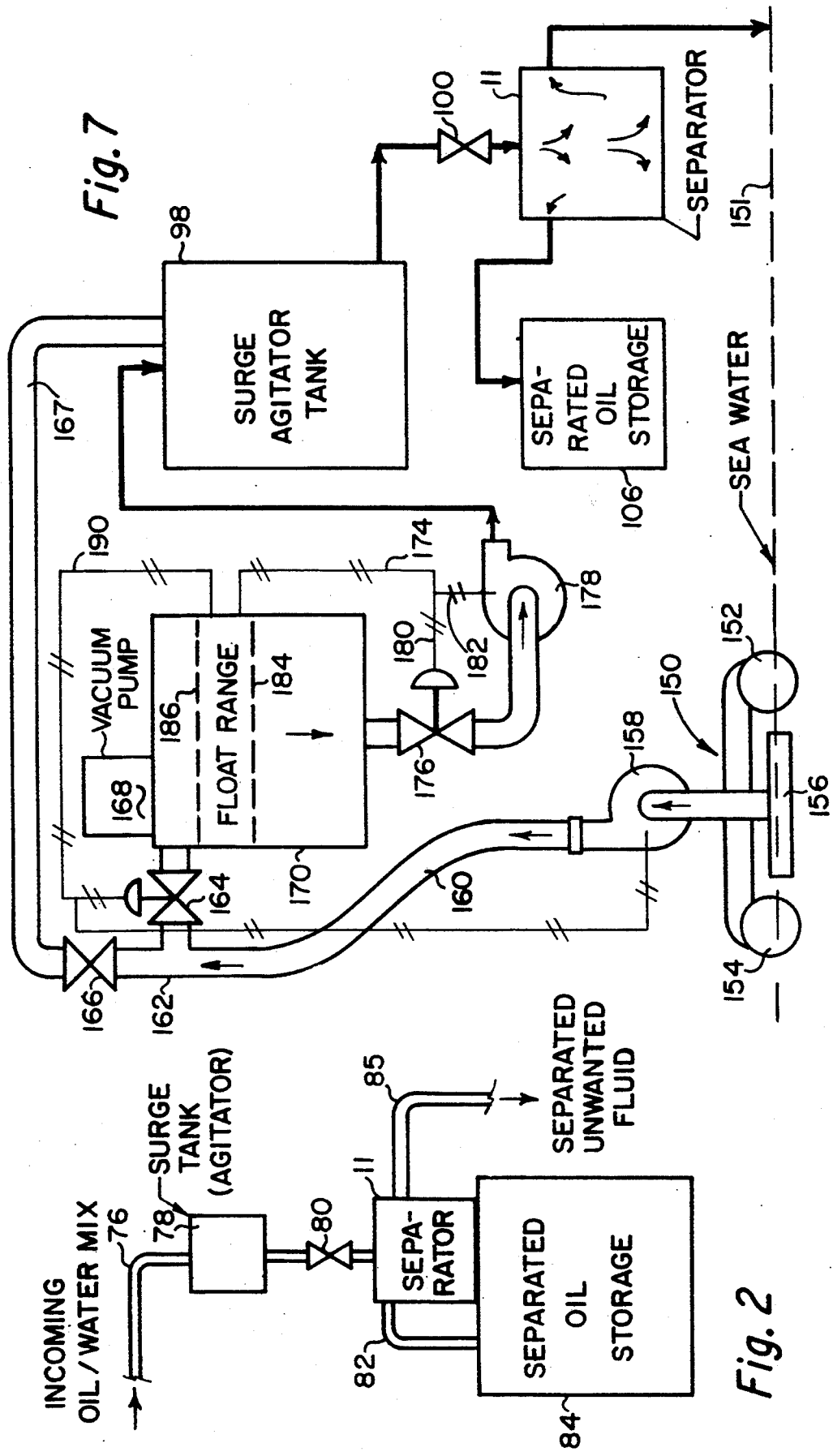

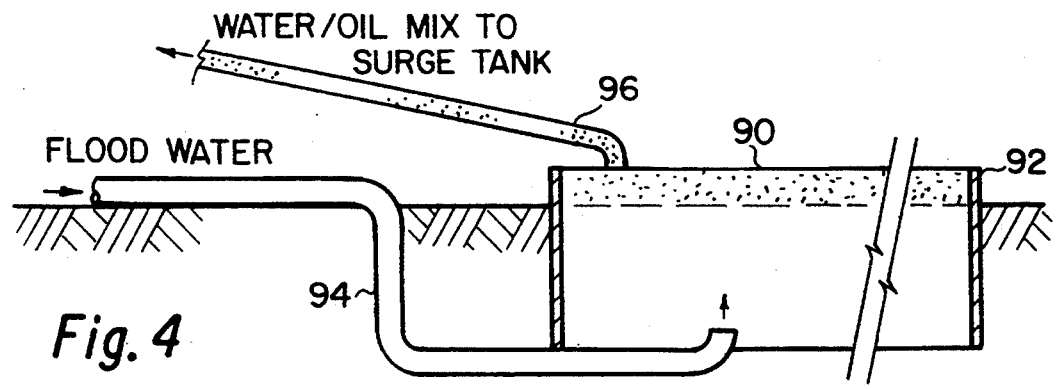
Fig. 4
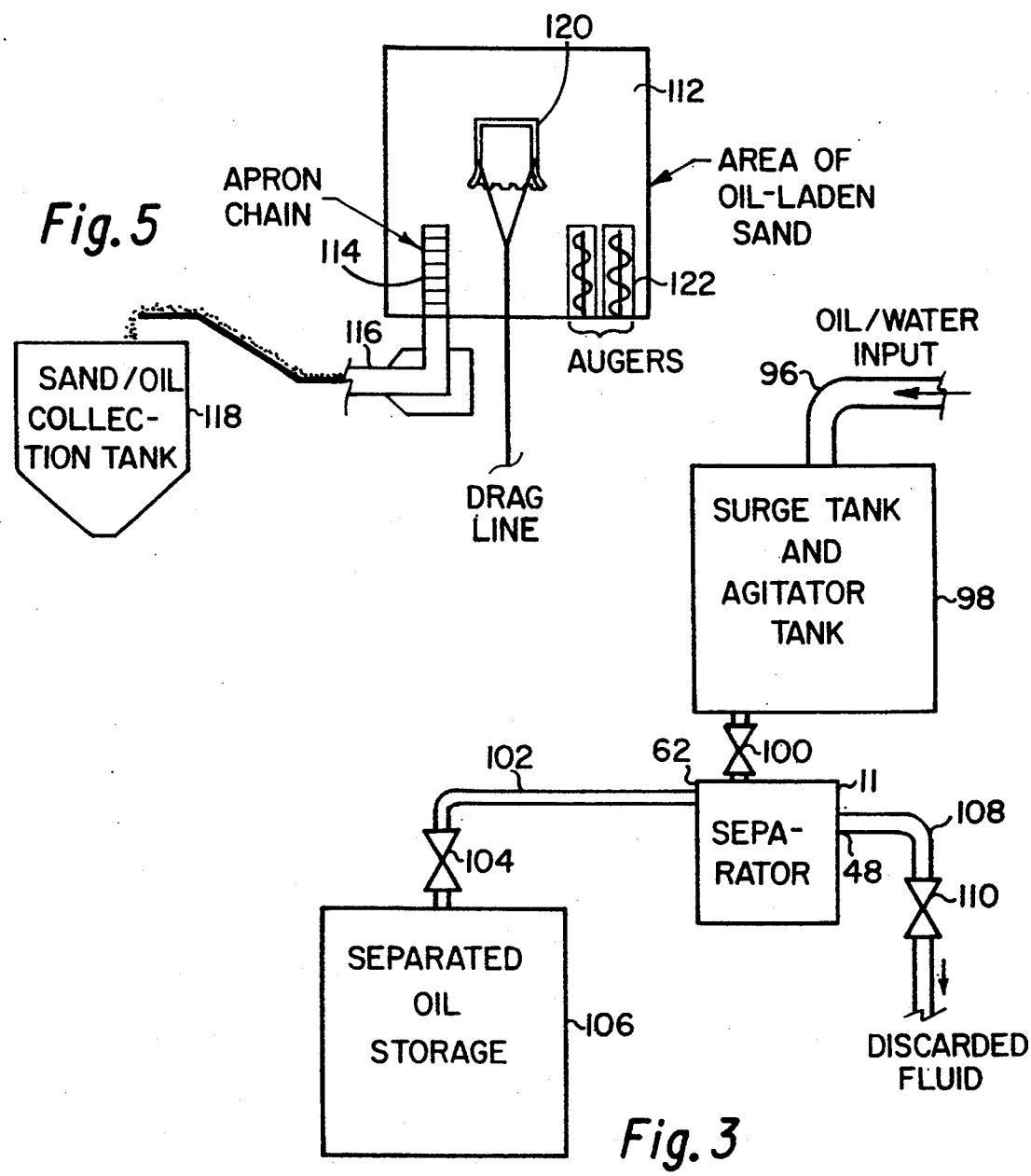
Fig. 5
Fig. 3

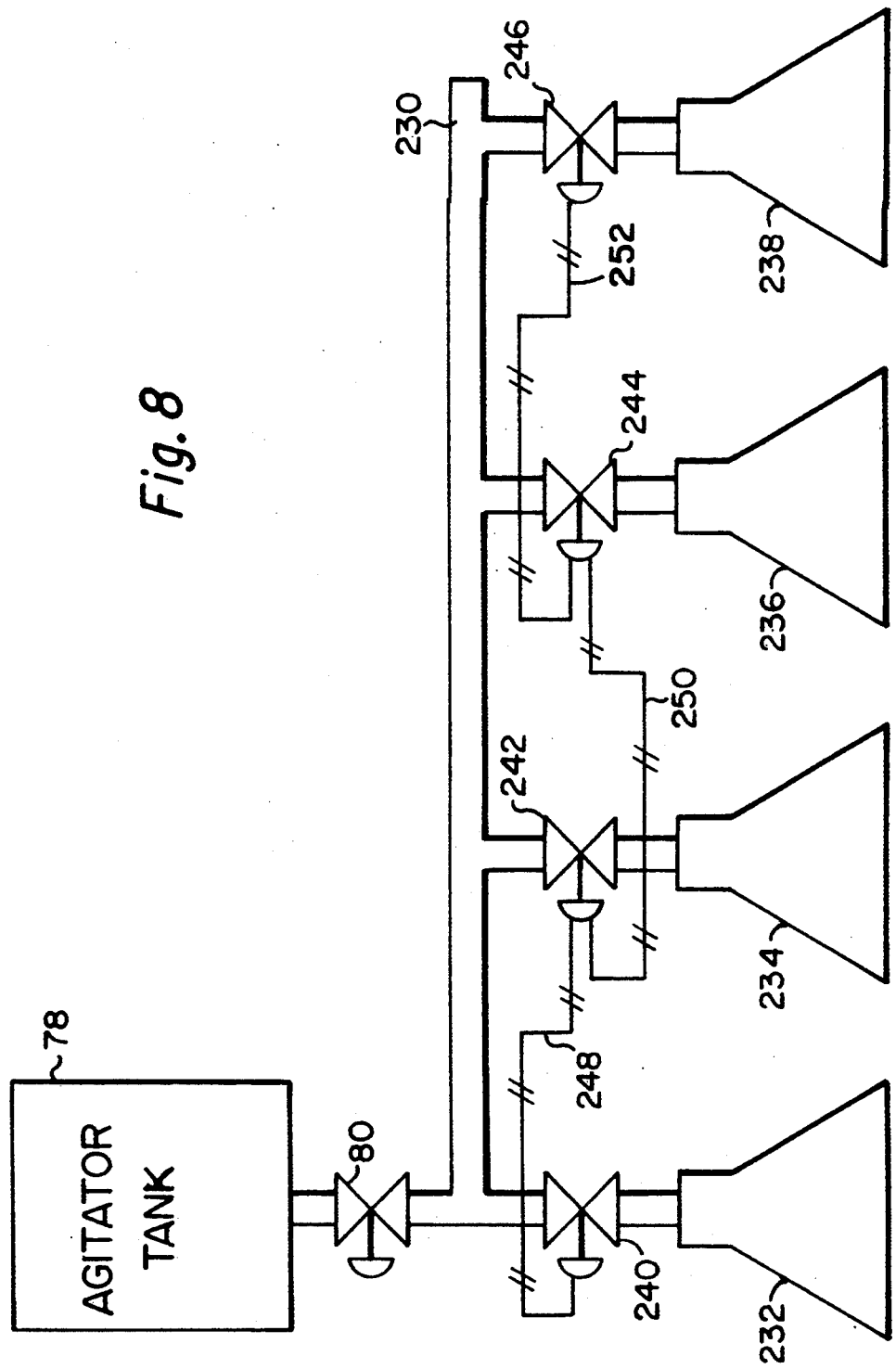

APPARATUS FOR REMOVING AN OIL SPILL ON A BODY OF WATER

This is a divisional application of Ser. No. 07/880,141 filed on May 7, 1992, now U.S. Pat. No. 5,316,029.

DISCLOSURE STATEMENT

Copies of patents resulting from a patentability search are listed on the attached form PTO 1449.

These patents disclose the concept of utilizing centrifugal separators for separating immiscible liquids, such as oil and water or oil/water and sand.

U.S. Pat. No. 2,249,653 issued Jul. 15, 1941 to W. H. Harstick shows a cream separator bowl using centrifugal force to effect separation of cream from extra milk. This is a typical separator as formerly used in the separation of whole milk into cream and skim milk.

None of the references show the concept of an oil separator that is described and claimed in the oil separator combination of this application.

FIELD OF THE INVENTION

This invention relates to the separation of oil, oil/water and oil/water/sand mixtures.

BACKGROUND OF THE INVENTION

Oil is a complex mixture of hydrocarbons with small amounts of other substances and is found in many places in the upper strata of the earth. Wells are drilled for these deposits and oil is produced. Oil is nearly always produced with some water and must be separated from the water before it can be used. There are elaborate transport systems for the oil, including pipelines that crisscross the country and, in some cases, even in water covered areas, Transport systems also include huge ocean-going oil tankers for carrying the oil. It is inevitable that there will be an occasional spill or leakage of the oil onto water or land. One of the most published oil spills is the Kuwait oil disaster created by the Gulf War of 1991. To limit the damage to the environment it is necessary to clean up these oil spills as expeditiously as possible. The invention disclosed herein shows a system for recovering oil from such spills.

SUMMARY OF THE INVENTION

The oil and water mixture to be separated is gathered and transported, preferably through a pipeline, to a surge and agitator tank. The agitation of the mixture can take place by either a tremendous volume of fluid or by use of an agitator. The surge tank has an outlet that is connected to a centrifugal separator. The separator separates the oil from the water, or other fluids, and the separated oil is transported to storage and the discarded fluid is disposed of.

There are many sources and means for obtaining the oil and water which flows into the surge and agitator tank. One such source is when oil has been spilled over a large area of earth that may or may not contain sand. In one system, precast concrete panels are placed upright in a trench in the ground with the top of the panels sticking out a sufficient distance to allow flooding of the earth in the fenced off area. The oil and water within the enclosed area is floated from the earth. The water and oil mixture is transported by the use of pipes and pumps to the surge tank previously mentioned. The oil is then separated by the aforementioned separator.

Another means of removing the oil from earth-laden oil spills includes the use of augers or drag lines or apron chains that pull the oil-laden earth toward and onto a conveyor system of belts for transporting to a collection tank. The sand/oil collection is then deposited in a tank that has an auger that performs two functions. (1) The straight or lower elevation portion of the auger does the initial washing and mixing of the earth as a soften flood water supply is provided to the mixed sand/oil that has been placed into the container. (2) Water flows into the auger upper portion to remove oil from sand in the auger as the auger is rotated lifting sand out of the auger tank and the washed sand is dumped on a suitable location and can be used for whatever purpose may be necessary. This "wash" water with the oil flows down the auger into the auger tank. The oil/water can then be removed from the auger tank for further processing. There is a fluid take-off from the auger tank that takes the oil and water mixture to a surge/agitator tank. From there the fluid goes to a separator.

Another source of the oil/water mixture may be the fluid produced from underground wells. The oil/water mixture is then supplied to a surge tank and then to the separator where it is separated.

Still another source of the oil/water mixture is oil spills that occur on water, such as on the ocean. In this case, there includes a vacuum head on the end of a flexible hose that extends from the vacuum head to the deck of a support vessel. The vacuum head floats on the water and is supported by two pontoons. The depth of the vacuum head can be controlled by the ballast in the pontoons. When the system is used on very large ships, it may be too great a distance to lift the oil/water mixture to the ship deck by vacuum alone. Therefore, a pump is located such as above the vacuum head to help boost the oil/water mixture to the wet vacuum system aboard the ship. The outlet of the vacuum machine is conveyed to a surge/agitator tank where it is then passed into the separator. In some instances, it is not necessary to use the wet vacuum system and the oil/water mixture can be pumped directly from the vacuum head on the water to the surge/agitator tank.

An object of this invention is to provide a novel means for separating oil from water; oil from water/sand and oil from water/earth mixtures.

A better understanding of the invention may be had from the following description taken in conjunction with the attached drawings.

DESCRIPTION OF THE DRAWINGS

FIG. 2 illustrates in diagram form a separator in conjunction with a surge tank and showing a separated oil storage and separated unwanted fluid discharge.

FIG. 3 is similar to FIG. 2 except that the separator does not support the surge tank and agitator tank.

FIG. 4 illustrates a vertical barrier built around a contaminated area of earth and shows means for flooding this contained area to contain a water/oil mix which will be separated.

FIG. 5 shows another method of obtaining a collection of sand/oil mixture from a contaminated area.

FIG. 7 illustrates a system for taking oil from a spill on water and then separating the oil from the collected water.

FIG. 8 illustrates the control of fluid from an agitator tank to multiple individual separators.

DETAILED DESCRIPTION OF THE INVENTION

Figure 1:
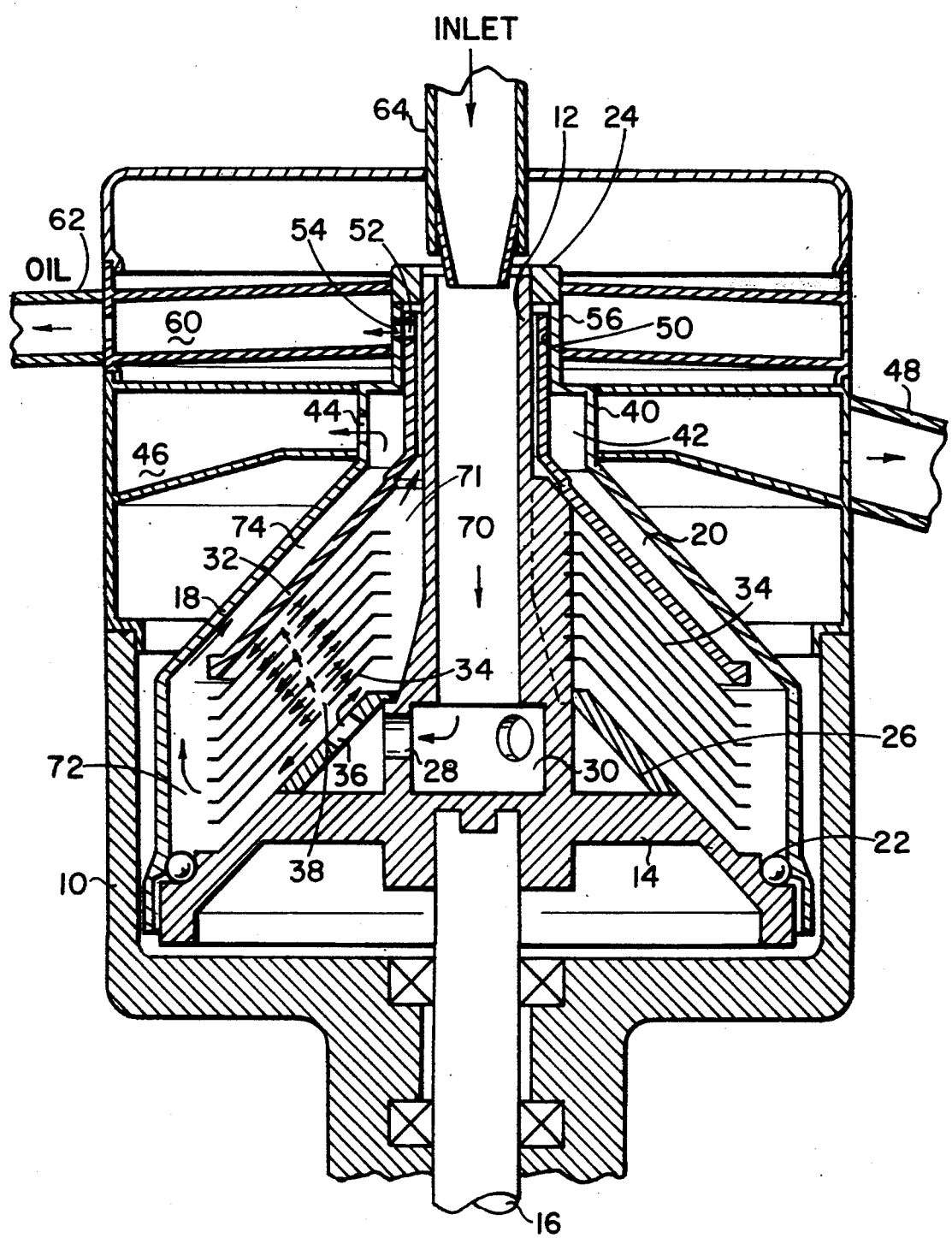
FIG. 1 illustrates a centrifugal separator for use in separation combination for removing oil from oil and water mixture.

Attention is first directed to FIG. 1 that describes the preferred separator for use in the processes described herein. There is shown in FIG. 1 a housing 10 and a drive center stem 12. The bottom of the hollow drive and center stem 12 is provided with an enlarged base 14 to which is connected a drive shaft 16. An outer shell 18 is positioned over center stem 12 and has an inner chamber 20. The lower end of outer shell 18 is sealed by O-ring 22 to base 14. The upper end of outer shell 18 is held in position by nut 24. There is a bottom inner disc 26 that is supported from base 14. Bottom inner disc 26 preferably has four holes 28 therein that are evenly spaced about cavity 30 in the lower end of hollow center stem 12 above base 14. An upper inner shell 32 is provided in chamber 20 and is spaced from outer shell 18. Between bottom inner disc 26 and inner shell 32 are a plurality of inner center discs 34. The bottom inner disc 26 has two ports 36 that are not in alignment with ports 28 in cavity 30. Inner center discs 34 are provided with holes 38.

The upper end of outer shell 18 is provided with a cylindrical portion 40 to form a cavity 42. Cylindrical portion 40 has a port 44 that opens into cavity 46. Cavity 46 opens into water outlet 48.

The upper end of inner shell 32 has a cylindrical portion 50 that is provided with a port 52 that aligns with port 54 of cylindrical portion 56 of outer shell 18. Port 54 opens into chamber 60 that fluidly connects with oil outlet 62.

The drive and center stem 12, bottom inner disc 26 and inner center discs 34 are all rotated by drive shaft 16. The outer shell 18 and inner shell 32 rotate within housing 10. Inner shell 18 is sealed with base 14 by O-ring seals 22. The entire assembly is driven at the bottom of drive and center stem 12 by drive shaft 16 that is connected thereto by means of a key or the like. The drive shaft is rotated by a means not shown. The flow of the fluid through the separator will now be discussed.

The oil/water mixture from sources that will be described in more detail hereinafter is transmitted through inlet 64, through the hollow interior 70 of drive and center shaft 12 and then outwardly through ports 28 and through ports 36 in bottom inner disc 26. The flow is thence through holes 38 in inner center discs 34 and in the spaces therebetween, as partially indicated by the arrows. The drive means rotates the entire assembly in the proper direction for causing separation at a tip speed at the outside diameter of the assembly, for example, equalling 15,000 feet per minute, plus or minus. The fluid continues to flow through the four holes 28 in the bottom inner disc 26. The edges of all of the holes in the rotating pans are machined to allow flow to happen trailing the direction of rotation so as to expel the fluid with as little turbulence as possible. The bottom inner disc 26 directs the fluid upward to the bottom of the inner center discs 34. There may be as many as 30 or more discs 34, depending on the amount of separation required.

The less dense particles flow upward and tend to follow a path along the inner drive and canter stem 12, as indicated at cavity 71. As the flow rises in the assembly through each center disc 34 more and more of the dense particles, or in this case water, are transported to the outside of the assembly following the path of the outwardly directed arrows along the inner center discs 34. All of the fluid is kept inside the assembly by the gasket seal between the drive and center stem 12 and the outer shell 18. The lighter oil is driven inwardly as indicated by the inwardly directed arrows. Oil traverses upwardly through cavity 71, out through ports 52, 54 and cavity 60 and into outlet 62 where oil can be recovered and used as may be desired. The heavier particles, such as water, are thrown outwardly into cavity 72 and then flow upwardly through cavity 74 between inner shell 32 and outer shell 18. The flow proceeds out through port 44, into cavity 46 and outwardly through water outlet 48.

Some important considerations must be observed. For example, there may be as many as thirty or more inner discs 34 depending on the amount of separation required. The metal thickness of the discs is as thin as can be made but will vary depending on the outside diameter of the entire assembly and must be thick enough to maintain integrity of the part. The inner center discs are designed with several small (normally round) spacers fastened to the underside of each disc to create a small space between each pair of discs. All of the components of this assembly are arranged in a way so that they are held in proper relationship to each other. As stated above, the two holes in the bottom inner disc 36 are not alignment with the four holes 28 in the driver and center stem 12. This non-alignment must be maintained in the assembly and operation of the separator. The inner center disc also has notches in the top portion to allow only one position of the assembly onto the driver center stem so that once properly aligned, i.e. non-alignment of parts 28 and 36, they are maintained there. The holes in the inner center disc 38 do align with the two holes 36 in the bottom inner disc 26. As is known in mechanical design, various uses of protrusions of varying widths and spacings and accompanying notches or other means may be used to effect the proper assembly.

Next, discussion will be had to the disclosure of establishing a mechanism required to make the separator described in connection with FIG. 1 into an integral system or systems for the collection and separation of oil spills, whether the spills are on land or on sea. One of the most published oil spills is the Kuwait oil field disaster created by the Gulf War of 1991. FIGS. 4 and 5 show several possible methods for collecting oil from the earth when the oil spill is on the ground. The basic method, of course, can be used if the spill occurs on either sand or earth. FIG. 4 shows a system of collecting spilled oil. There is a placement of walls 92, preferably made of precast concrete panels, that are placed vertically in a trench in the ground completely surrounding the particular tract or area to be cleaned up. These panels are placed in the ground so that the tops of the panels stick out of the ground at a sufficient distance to allow flooding of the earth. These panels may be made with shiplap joints bolted together at the top and bottom. Grouting of the joints with a suitable grouting adhesive makes the joints water tight. This type of panel has been built, tested and known to be sufficiently strong to do this particular job. It is interesting to note that these panels can be used for houses, industrial buildings, and the like after their use in the clean up of oil spills.

Flood water is injected through conduit 94 and into the lower portion of the enclosed oil soaked earth. The water then circulates or travels up through the enclosed area and leaves through transport pipe 96 that takes the water/oil mixture 90 to a surge tank such as shown in FIG. 3. The oil and water can be mixed by the use of an emulsifier, if required, and floated from the enclosed sand/earth. The oil/water mixture from pipe 96 is transported to a surge tank and agitator tank 98 as shown in FIG. 3. If there is more "earth" than "sand" when the oil spill has occurred, it may be necessary to place the oil/water mixture in a sediment tank similar to a septic tank where the mud can settle out before separation takes place. The fluid in the surge tank is subject to agitation by the tremendous volume of fluid or by the use of a mechanical agitator or both the agitator and the volume. The agitator tank will provide the homogeneous mixture needed for separation. Sea water's specific gravity is about 1.03 and that of crude oil about 0.82. Because they are so close, it is apparent that they will mix with some agitation. If necessary a suitable water soluble emulsifier may be added or softened water may be used. This helps unlock the oil molecules or other foreign substance from the sand. It will also help make the oil/water mixture a homogeneous mixture. The oil/water mixture then passes from tank 98 through a valve 100 into separator 11 such as described above in relation to FIG. 1. Valve 100 may be a Constant Modulator Valve (C.P.M.) as care must be taken not to overfeed separator 11. The oil/water mixture is then separated, as described, and the separated oil flows outward through outlet 62 to conduit 102 and valve 104 to a separated oil storage tank 106. The waste fluid from separator 11 flows out of outlet 48 through conduit 108 and valve 110 to any suitable discharge facility.

One reason for the use of the agitator tank is that the oil spill and flow of the vacuum pump may be too great for one separator to handle. By placing the oil mixture into the agitator tank and with the use of a charge pump through C.P.M. valves, the flow to the separator can be controlled to its capacity. On the other hand, one may wish to use a smaller tank as an agitator tank without agitation. For example, if the capacity of the separator is 80 gallons per minute or 4800 gallons per hour, using a tank with a volume approximately 2000 gallons as leveling tank will do two things. First, the flow rate coming into this tank is great compared to its size and agitation will take place simply by the flow of the liquid. Second, feeding out of this tank directly to the separator can be controlled by a simple gate valve instead of an expensive C.P.M. valve.

The constant level of the agitator tank can be controlled simply by floats so that there is always a maximum given pressure (head) to feed the separator. Further, it may be practical, at little additional cost, to have two smaller separation units aboard a ship or wherever the spill is located, and have them run at the same time at a reduced flow to effect proper efficiency and to reduce the possibility of overfeeding the individual separators which would result in poor separation. For example, two 3000 gallons per hour units are approximately 15 percent more expensive than one 5000 gallon unit. It does not harm a separator to operate empty, therefore, the two units can be operated at a reduced volume without harm to the units. This also gives advantage of having one unit available in case of failure of the other. Likewise multiple separators can be used for larger spills with large volumes. As one separator reaches its capacity, a control valve (C.P.M.) will start flooding another separator in sequence. There may be several (eight or more) separators used together in sequence.

Attention is next directed to FIG. 8 which illustrates a control system for fluids from an agitator tank flowing to several independent separations. The use of multiple separators is illustrated in FIG. 8. Shown thereon is an agitator tank 78 and control valve 80 in the outlet thereof, which is similar to that shown in FIG. 2. The outlet from valve 80 is connected to manifold 230 which has a plurality of outlets, each outlet having control valve 240, 242, 244 and 246 respectively. The outlet to the valves are connected respectively to individual separators 232, 234, 236 and 238. These control valves are designed to prevent flow greater than a maximum capacity flow for each separator associated therewith. For example, if the maximum capacity of separators 232, 234, 236 and 238 is 1,000 gallons per minute, then valves 240, 242, 244, and 246 will not permit over that amount of volume. Valve 240 is the first to open and, in fact, can be set to open at all times. When valve 240 reaches a selected volume, e.g. 800 gallons per minute, it sends a signal over conduit 248 to valve 242. Upon receiving this signal the circuity of valve 242 causes that valve to open and fluid then also flows out of manifold 230 into separator 234. Likewise when the volume of valve 242 reaches a selected value the circuity of valve 242 sends a signal over line 250 to valve 244 to cause valve 244 to open. Likewise when valve 244 reaches a selected volume of flow therethrough, the circuity of valve 244 sends a signal over the conduit 252 to valve 246 which causes that valve to open. It is well known to have control valves that limit the control to a maximum rate and also to send forth a signal when a selected rate or volume has been reached. Poor separation may result from a centrifugal separator if it is overloaded, however, it does essentially no damage to the separator to run at less than capacity.

Attention is next directed to FIG. 5 that depicts another form of an earth-laden oil spill collection method. FIG. 5 illustrates the system of removing oil-laden sand and transporting it to a collection tank where it can be processed. One such system would be an apron chain 114 that may be made from chains and slats, as the most common form, and the apron would pull the oil-laden earth toward and onto a conveyor system 116 of belts, augers or the like. The oil-laden sand is then transported to sand/oil collection tank 118.

In further regard to FIG. 5, another form of collection of oil and sand would be the use of a drag line system 120 or augers 122. The drag line may drag the oil and sand in any convenient manner and place it on or in any type of conveyance system that would convey it to sand/oil collection tank 118 for further processing. The augers 122 may be augers that counter-rotate to transfer the oil-laden sand. Other systems of collecting the oil-laden sand may be scraper pans or dump trucks or any other suitable means of moving oil-laden sand from its normal deposit in area 112 to sand/oil collection tank 118.

Figure 6:
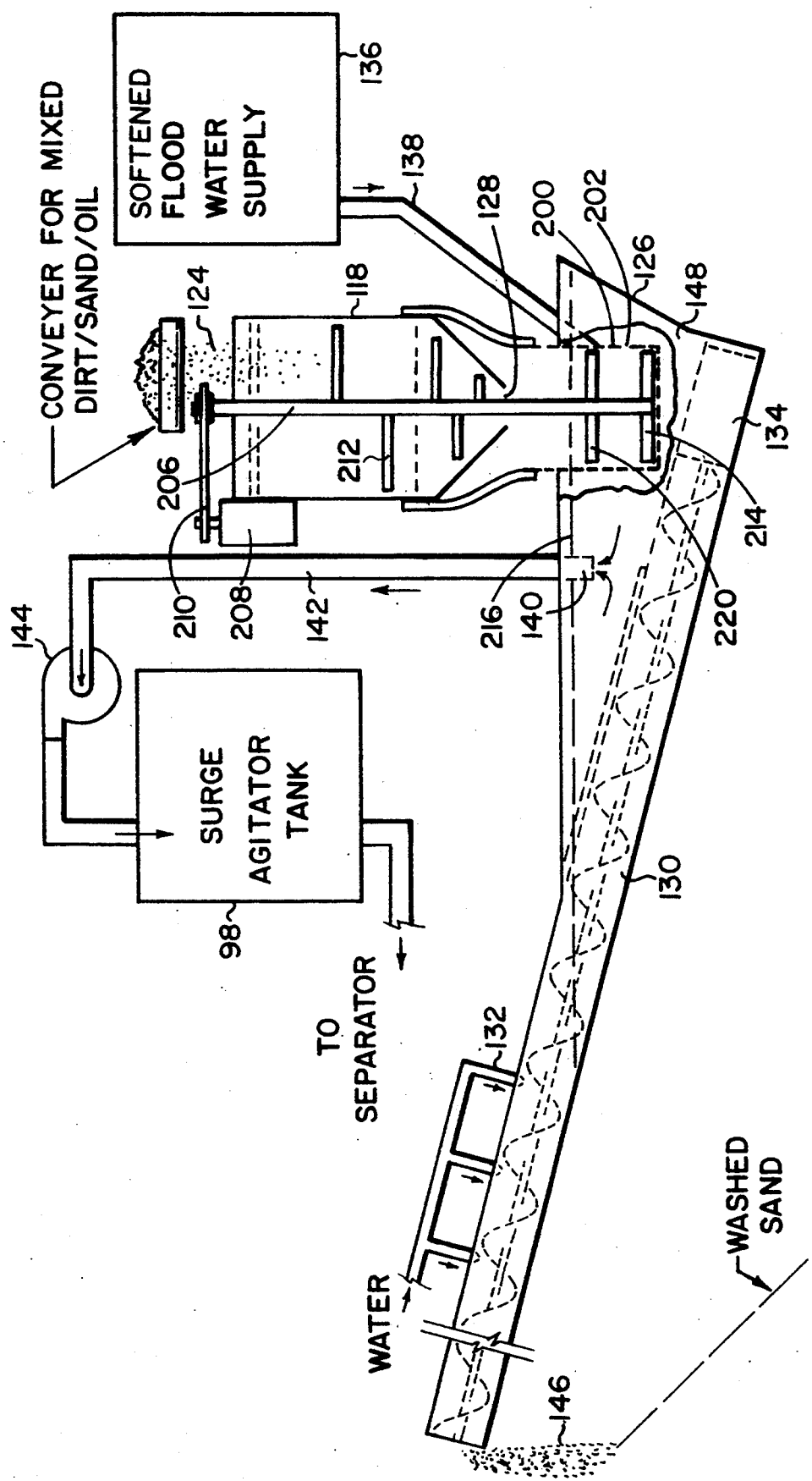
FIG. 6 illustrates a system or apparatus for taking the mixed sand/oil collection and separating out the oil from the sand.

Attention is next directed to FIG. 6 that illustrates a method of removing the oil from the mixed sand/oil collection. As shown, there is a mixed sand/oil collection tank that may be tank 118 of FIG. 5. FIG. 6 shows a conveyor system dumping mixed dirt and/or sand and oil 124 into collection tank 118. Any way of obtaining and transporting the mixed dirt, sand and oil from contaminated area 112, such as that described with regard to FIG. 5, can be used to load the mixed sand/oil collection tank 118.

The bottom of collection tank 118 is provided with an outlet 128. Directly below outlet 128 and below the bottom of tank 118 is a basket 200 which is made preferably of a perforated material, such as steel or plastic. Basket 200 is fastened to tank 118 and surrounds opening 128 so that material from collection tank 118 drops into basket 200. The perforations 202 may, for example, be about ⅛ to ½ inches in diameter. The basket is preferably round and is several times (e.g. three or more) larger in diameter than the tank opening 128. The bottom of the basket rests sufficiently below the fluid level 216 so as to be below most of the oil floating on the top of the water. A drive shaft 206 goes through the approximate center of tank 118, through opening 128 and into basket 200. Mounted on drive shaft 206 are a plurality of outwardly extending agitating rods or arms 212, which are located in collection tank 118, and outwardly extending agitation rods 220 and 214, which are in basket 200. These agitator rods may, for example, only be 1 to 2 inches in diameter and may be any practical number. The lower agitator rod 214 is near the bottom of basket 200 and preferably is made of steel with a rubber belt on the steel to improve its wear characteristics. Paddle or rod 214 rests adjacent to the bottom of the basket and sweeps the earth or sand in a rotary motion over the bottom of the basket. Drive shaft 206 is mounted for rotation within the tank and is driven by drive chain or other means 210 which is connected to a motor 208.

The bottom of basket 200 is positioned in auger tank 126 in the deep part thereof. Auger tank 126 has a liquid level 216. Basket 200 goes well below this level. There is an auger 130 provided in auger tank 126. Also provided is a soften flood water supply 136 which flows through line 138 into auger mixer tank 126 in the general area of the straight portion 134 of auger 130. Line 138 may, if desired, terminate in the vicinity of the bottom of basket 200 and will be in the vicinity of or generally vertically above straight portion 134. There may be a control valve in line 138 to regulate the amount of water flowing therethrough into tank 126. Straight portion 134 is generally that part of an auger that extends into the open cavity 148 of tank 126 and is in a position where the sand can be picked up by the auger. The earth/oil mixture flows out of collection tank 118 and through basket 200 at whatever rate is necessary for proper separation of oil and earth by the stirring-washing process of auger straight portion 134, plus the addition of the flood water supply. Tank 126 is also provided with outlet 140 that permits flow of oil/water out of auger tank 126. Outlet 140 connects into pipe 142 that conveys the oil/water mix separated from the sand/earth to surge/agitator tank 98. This flow out of tank 126 may be assisted by pump 144 that is in line 142. The surge/agitator tank 98 operates to convey the mixture to separator 11, such as described above in regard to FIG. 3.

We will next discuss the operation of FIG. 6. To get the most amount of oil from the earth, a three-stage wash cycle is used. Bridging of the oil/earth mixture in collection tank 118 can be avoided by use of a vibrator (not shown) connected to the outside of the tank or preferably by an agitator shaft 206 driven by motor 208 as shown. Agitator shaft 206 has a plurality of agitator rods connected thereto to keep the oil/earth mixture from bridging so uniform flow of material can be achieved at exit 128. Drive motor 208 should be of a sufficient size and speed to effect rotation of shaft 206 at a relatively slow speed. The bottom of basket 200 rests sufficiently below fluid level 216 so as to be below most of the oil floating on top of the water. The oil/earth mixture from collection tank 118 drops directly into basket 200. As the agitation shaft turns, paddles arms 220 and 214 sweep the earth in a rotary motion over the bottom of the basket. These arms are relatively small in area compared to the cross-sectional area of the basket. This movement exposes all of the earth particles to washing water before it passes through the perforations and dropping onto the stirring auger below. As the earth (or sand) continues to enter auger tank from basket 200, the washed earth is caught by the auger 130 and elevated up out of the wash basin. Toward the top of the auger there is provided a water inlet or jet means 132 that additionally washes the sand. The typical angle or preferred angle of the auger is approximately 15 degrees with the horizon but can be adjusted depending on the complexity of the washing process. The washing of the oil/sand occurs in three stages. The first stage of the wash is the washing which takes place in the perforated basket. The second wash stage is the mixing auger at area 134 at the bottom of tank 126. The third wash stage is the additional water sprayed through jets 132 above the liquid line but through the auger chute as the earth 146 is carried by the auger mechanism and discharged. These three wash stages assure an adequately washed oil/sand material. If the sand being washed is the oil-laden earth, the washed sand can be used as sand for asphalt. The small amount of oil remaining on the sand will only enhance the asphalt. Tests indicate that approximately three to one ratio of washing fluid to sand is required.

The auger chute should be made of rubber or some other strong plastic because of the abrasive quality sand has on steel or iron chutes. Rubber, of proper durometer, has a known longevity over steel in this type of application by as much as ten times.

As mentioned above, when oil wells are produced there is nearly always some water produced with the oil. This water must be separated out. A suitable means for doing this is illustrated in FIG. 2. Shown therein is a separator 11 such as described above. Oil/water mixture from one or more wells is pumped through line 76 into a surge tank 78, that can also be an agitator by volume of flowing fluid or by mechanical means. If the oil to be separated is too cold, operating problems may be encountered. These can be overcome by heating the oil. Suitable heating means includes insulation and/or electric induction coils wrapped around the incoming pipe, or hot water coils, etc. The fluid from surge tank 78 is fed through a line having a valve 80 thereon into separator 11, which has been described above in regard to FIG. 1. Valve 80 is preferably a C.P.M. valve that can be carefully regulated so as to not overload separator 11. The separated oil from the separators feeds through line 82 to a storage tank 84. The discharge is conveyed out through line 85 to some facilities (not shown) that would be used to dispose of the unwanted fluid. This unwanted fluid can be discharged in a suitable economic manner by way of wells or a septic system. Sometimes the wells may produce up to 20 percent water. A separator system, such as shown in FIG. 2, may be placed at each well that is producing water. Alternatively, the process would be the same for water separation for multiple wells where the fluid is produced in many wells and is transported to a single separator system, such as shown in FIG. 2. The separated water can be disposed of in many ways, such as running it back into the well into selected underground stratum or by laterals under the ground similar to common leach fields. The laterals will be of such a depth so as to not effect the root system of growing trees or vegetation. This is required because salt water is the normal form of water drawn from oil wells. Another method of disposing of salt water is to drill a well into a salt water underground formation and to expel the separated water into the well.

With the system just described, the separated oil can be discharged into an oil storage tank or system as pure crude oil. In the past, chemicals were placed in the crude oil to disperse the water. That procedure included the cost of the chemicals, plus the wasted cost of special transportation of the oil/water mixture to the refinery. With the proposed system herein the cost of the chemicals and the cost of transporting the excess oil/water mixture to a refinery facility are eliminated.

Oil spills on water is another environmental problem. FIG. 7 shows a system useful for taking oil from a spill on water and separating the oil from the collected water. Shown therein is a vacuum head unit 150 supported by pontoons 152 and 154 that support the vacuum head at the right depth with regard to the sea water surface 151. The depth of the vacuum head can be controlled by the ballast in the pontoons or by the addition or substraction of water from them. A flexible hose 160 connects the vacuum head 156 to facilities on top of a ship (not shown). The oil/water mixture taken up by vacuum head 156 goes to a surge/agitator tank 98. Sometimes this collected oil/water mixture may be directed through a wet vacuum system including vacuum canister or tank 170 on a ship, not shown. Preferably a pump 156 is in flow line 160 adjacent to vacuum head 156. If it is desired to bypass the vacuum chamber 170, valve 164 is closed and valve 166 is opened and the control conduit 190 from level float switches 186 is disconnected from pump 156. Valves 164 and 166 are adjacent the "Y" 162. The pipeline 167 extends from valve 166 to surge/agitator tank 98. When desired, pumping the collected oil/water mixture to a vacuum pump canister 170 can be accomplished by closing valve 166 and opening valve 164. There is a vacuum pump 168 secured to vacuum canister 170. Depending on the height to be pumped the system may be used with or without pump 158 at vacuum head 156. The discharge from vacuum pump 168 is into vacuum canister 170. As indicated, the wet vacuum canister 170 has two float switches, at one level 184 and at a second level 186. When the first level 184 is reached, the float switch turns "on" and sends a signal through conduits 174 and 180 to valve 176 to cause it to open. However, a signal is also sent through line 182 to pump 178 in the outlet line from canister 170 and causes it to operate approximately one-half to three seconds before valve 176 is opened. There is a delay built into the circuitry of valve 176 to obtain this delay in opening after receiving an "open" signal. Because of this delay the fluid from pump 178 can be transferred from wet vacuum canister 170 to surge/agitator tank 98 without the wet vacuum system loosing its vacuum. If the upper level 186 is reached in vacuum canister 170 it sends a signal over conduit 190 to cause pump 158 to shut down.

The fluid from surge/agitator tank 98 is processed through valve 100 to separator 11 as described above. The separated oil flows into oil storage 106.

An oil spill on the water can be contained by booms already on the market so that the oil can be vacuumed up, separated and cleaned. In cases where spills are very large, a ship may be equipped with one or more separators, vacuum pumps or whatever machinery is necessary to rapidly eliminate any oil spill that may have occurred.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for removing oil from an oil spill on a body of water which comprises:
    a floating vacuum head supported at the surface of said body of water;
    a surge tank;
    fluid transport means to connect the vacuum head to said surge tank;
    a centrifugal separator having a plurality of rotating discs, said separator having an oil/water inlet and an oil outlet and a water outlet;
    means to connect said surge tank to said inlet of said centrifugal separator; and
    a support structure for supporting the tank, fluid transport means, and separator,
    said fluid transport means between said vacuum head and said surge tank includes a vacuum pump;
    a wet vacuum canister having an inlet and an outlet;
    a control valve connected to said outlet of said wet vacuum canister;
    a pump connected to said control valve;
    a discharge line from said pump to said surge tank;
    a float control in said vacuum canister operable to start said pump a selected time period before the opening of said valve;
    a second float control in said wet vacuum canister; and
    a valve on the inlet to said canister, said second float control being operable to close said valve when said fluid in said vacuum canister reaches a preselected level.

2. An apparatus as defined in claim 1 in which said selected time period is between about ½ to 3 seconds.

3. An apparatus as defined in claim 1 in which said support structure is a floating ship.

4. An apparatus as defined in claim 1 in which the vacuum head is supported on water by two spaced apart pontoons.

* * * * *